United States Patent [19]

Takashima

[11] 3,893,846

[45] July 8, 1975

[54] SLAG FORMING AGENT FOR STEEL MAKING

[75] Inventor: Masaru Takashima, Tokyo, Japan

[73] Assignee: Aikoh Co., Ltd., Tokyo, Japan

[22] Filed: Nov. 23, 1973

[21] Appl. No.: 418,737

Related U.S. Application Data

[63] Continuation of Ser. No. 269,045, July 5, 1972, abandoned.

[52] U.S. Cl............................................ 75/94; 75/53
[51] Int. Cl. .......................... C22b 9/10; C21c 7/00
[58] Field of Search.................................. 75/74, 53

[56] References Cited
UNITED STATES PATENTS

| | | | |
|---|---|---|---|
| 2,416,179 | 2/1947 | Kemmer | 75/53 |
| 3,436,209 | 4/1969 | Lojas | 75/53 |
| 3,446,614 | 5/1969 | Johnson | 75/53 |

*Primary Examiner*—Peter D. Rosenberg
*Attorney, Agent, or Firm*—Fay & Sharpe

[57] ABSTRACT

A slag forming agent for steel making which comprises 54 to 90 percent by weight of aluminium dross containing more than 30 percent by weight of aluminium oxide, 5 to 20 percent by weight of cement, 2 to 10 percent by weight of calcium compound, 1 to 15 percent by weight of chloride and small amount of water.

4 Claims, No Drawings

SLAG FORMING AGENT FOR STEEL MAKING

This is a continuation of application Ser. No. 269,045, filed July 5, 1972, and now abandoned.

The present invention relates to a slag forming agent which is added into furnaces such as basic oxygen furnace, electric arc furnace and open hearth furnace when steel is made.

Heretofore, calcium fluoride, lime stone, calcium-silicon alloy, ferrosilicon, etc. have been used in steel making as the slag forming agent, and also there was known a process wherein aluminum dross or aluminum dross containing a small amount of aluminum is added in the slag of chromium alloy steel after oxygen blow refining to recover chromium oxide in the slag into molten steel as well as promote the formation of reducing slag.

However, the slag former in the form of powder such as aluminum dross, one having aluminum dross as main component, alumina or the like scatters when added onto the slag in the furnace, and also remains only on the surface of slag to form slag, thereby the desired functional effect being unable to attain.

Also, since the aluminum dross is produced as a by-product in the refining process or manufacturing process of reclaimed mass of metallic aluminum, it sometimes contains a variety of fluxes added in the processes and also contains $SiO_2$ and a small amount of Al, thereby its components and content thereof are indefinite. Therefore, the employment of only aluminum dross can not attain the desired effect.

The use of fluorspar ($CaF_2$) impairs the furnace wall and further generates fluorine gas to deteriorate the operation environment. Particularly, fluorspar is recently not sufficient in supply thereby degrading, and is considered as one of undesirable materials for steel making.

The slag forming agent for steel making according to the present invention eliminates the defects of conventional slag former, and rapidly forms the white slag when added after oxygen blow refining process, and also maintains a proper fluidity of slag. It also sinks into the slag immediately upon adding to initiate reaction, and continues slag forming, resulting in a satisfactory reaction condition.

Also, the slag forming agent of the present invention, when used in the production of stainless steels, reduces Cr in the slag back into molten steel as well as does not change the composition of slag even in the finishing period of refining process.

It also has a good deoxidizing effect.

According to the present invention, there is provided a slag forming agent for steel making which comprises 54 to 90 percent by weight of aluminum dross containing more than 30 percent by weight of aluminum oxide, 5 to 20 percent by weight of cement, 2 to 10 percent by weight of calcium compound, 1 to 15 percent by weight of chloride and small amount of water.

The preferable composition of the slag forming agent for steel making according to the present invention is as follows:

| | |
|---|---|
| Aluminum dross containing more than 30% by weight of $Al_2O_3$ | 54–90% by weight |
| Cement | 6–20% by weight |
| Calcium compound | 2–10% by weight |
| Chloride | 1–15% by weight |
| Water | 1–7% by weight |

The slag forming agent for steel making according to the present invention may be preferably used in the form of molded mass.

The aluminum dross used as a raw material of the slag forming agent of the present invention is that publicly known in itself.

The cement is used as a binder, and one or more of Portland cement, alumina cement, iron cement and slag cement can be used. In the experiments, the use of both Portland cement or alumina cement gives the most satisfactory results.

The calcium compound used includes calcium carbonate and calcium hydroxide which are desirable because they cause a rapid setting of the cement used as a binder, and also in some cases they are effective for adjusting the melting point of the aluminum dross having indefinite components.

The chloride is particularly used as a raw material of the slag forming agent of the present invention to improve the fluidity of slag, and the preferable one is magnesium chloride and sodium chloride.

Whereas it is known that the aluminum oxide converts the binary system slag $CaO\text{-}SiO_2$ into the ternary system slag $CaO\text{-}SiO_2\text{-}Al_2O_3$ to thereby lower its melting point producing a slag of proper fluidity, its content in the aluminum dross fluctuates as described above. Therefore, in order to improve constantly the fluidity of slag and obtain a slag forming agent having a desirable functional effect, it is necessary to use the chloride.

Water is used to set the cement used as a binder, and a small amount thereof remains as water of crystalization in the slag forming agent.

The slag forming agent sinks into the slag immediately when added onto the slag within the furnace, thereupon discharging the water of crystallization in the slag and decomposing to be distributed in the slag to promote the reaction.

The slag forming agent of the present invention is prepared by mixing a predetermined amount of each of the raw materials described above, which is formed into briquettes or tablets by means of press roll, granulator or any other molding machine. The agent having a size of 10 to 30 mm is satisfactory in its functional effect.

Examples of the slag forming agent according to the present invention will now be described.

EXAMPLES 1 TO 3

The composition and shape of the slag forming agent for steel making of the present invention and the prior slag forming agent for steel making are destribed in the following Table.

TABLE

| | Example | | | Prior |
|---|---|---|---|---|
| | 1 | 2 | 3 | product |
| Aluminum dross (containing 49% $Al_2O_3$, 12% Al) | 62 (% by wt.) | 70 (% by wt.) | 80 (% by wt.) | 100 (% by wt.) |
| Alumina cement | 8 | 7 | 5 | — |
| Portland cement | 8 | 7 | 5 | — |

TABLE – Continued

|  | Example 1 | Example 2 | Example 3 | Prior product |
|---|---|---|---|---|
| Calcium hydroxide | 8 | 4 | 3 | — |
| Sodium chloride | 10 | 9 | 5 | — |
| Water | 4 | 3 | 2 | — |
| Shape and size of molding (length × width × thickness) | Briquette 25×25×15 | Briquette 25×25×15 | Briquette 25×25×15 | Powder |

EXPERIMENTAL METHOD

Using a 8 tons electric arc furnace and stainless steel containing less than 0.08 percent by weight of carbon, less than 1.0 percent by weight of silicon, less than 2.0 percent by weight of manganese, less than 0.04 percent by weight of phosphorus, less than 0.03 percent by weight of sulfur, 8 to 10.5 percent by weight of nickel and 18 to 20 percent by weight of chromium, 2.6 kg/ton of molten steel of each of the slag forming agents of Examples 1 to 3 and the prior product having composition and shape indicated in Table was added under approximately the same conditions in the finished period of refining process.

EXPERIMENTAL RESULTS

The slag forming agents of Examples 1 to 3 according to the present invention produced a white slag in 5 minutes after addition, and indicated a faster reaction then the prior product in the form of powder and a satisfactory fluidity of slag.

Also, the slag forming agents of Examples 1 to 3 sank into the slag and indicated desirable reaction conditions.

Particularly, the deoxidation process proceeded satisfactorily, and the oxygen content after five minutes after addition of the slag forming agent was reduced to about one-half of that of the finishing initial period, and the oxygen content at the end of the finishing period was reduced to about one-fourth.

Thus, it has been found that the slag forming agent according to the present invention can produce functional effects as described above, and therefore can be used in place of other expensive slag forming agents, and also can reduce the time required in the reducing period, thereby enabling cost reduction of steel making, and, further, it can reduce the amount used of the conventional fluorspar to half of the normal amount, and in some cases, can replace the total amount thereof.

While the aluminum dross used as a raw material of the slag forming agent of the present invention is publicly known in itself, it should be used in an amount of 54 to 90 percent by weight. The aluminum dross less than 54 percent can not produce the functional effects as described above, and that exceeding 90 percent reduces the content of other effective components, thereby the desired effects being unable to be attained. The aluminum dross used should contain $Al_2O_3$ of at least 30 percent by weight, and the aluminum dross containing $Al_2O_3$ of less than 30 percent by weight can not attain the desired functional effects, and, therefore, should not be used.

The cement is used as binder and should be used in an amount of 5 to 20 percent by weight. The cement of less than 5 percent by weight is sometimes difficult to produce the molding, and also not desirable due to decomposition during handling or prior to addition into the furnace. And, the agent produced by using it exceeding 20 percent by weight does not cause immediate decomposition upon adding into the furnace to thereby retard initiation of the reaction with slag, thereby the desired effects being unable to be attained, and should not therefore be used.

The calcium compound such as calcium carbonate, calcium hydroxide, and the like is used preferably in amount of 2 to 10 percent by weight, that less than 2 percent by weight being not effective for the rapid setting of the cement and that exceeding 10 percent by weight being unnecessary to be used.

The chloride is particularly used to maintain the proper fluidity of slag, and used in an amount of 1 to 15 percent by weight, depending on the flux content in the aluminum dross. If more than 15 percent by weight of chloride is added, it will result in giving the slag forming agent an improper high fluidity.

While water is used in a proper amount depending on the amount of the cement used as binder, it is preferably contained in an amount of 1 to 5 percent by weight as water of crystallization in the molded slag former, because when the molded slag former is added into the furnace, it discharges the water of crystallization to thereby decompose and distribute the molding in slag and improve the reactivity of the slag former.

The slag forming agent for steel making according to the present invention uses the aluminum dross as a raw material which is publicly known as a slag former, but it does not use the conventional aluminum dross containing metallic aluminum alone. It is used in the form of composition as well as molding thereby it does not scatter as dust upon adding as the conventional powdered slag forming agent, and it also does not remain on the surface of slag in the furnace when added without reducing the functional effects, and also can be used in place of other expensive slag forming agent such as calcium-silicon alloy, and, further, can be used replacing a half or the total amount of fluoride usually employed, thereby providing a satisfactory slag forming agent for steel making.

What I claim is:

1. A method of forming slag during a steel making process which comprises adding to molten steel being processed a slag forming agent comprising:
    a. 54 to 90 percent by weight of aluminum dross which contains more than 30 percent by weight of aluminum oxide;
    b. 5 to 20 percent by weight of cement;
    c. 2 to 10 percent by weight of a calcium compound selected from the group consisting of calcium carbonate, calcium hydroxide and mixtures thereof;
    d. 1 to 15 percent by weight of a chloride compound selected from the group consisting of magnesium chloride, sodium chloride and mixtures thereof; and
    e. from about 1 to about 7 percent by weight of water.

2. The method of claim 1 wherein said cement is selected from the group consisting of Portland cement, alumina cement, iron cement, slag cement and mixtures thereof.

3. A composition adapted for use as a slag forming agent in steel making which is obtained by mixing together:
 a. 54 to 90 percent by weight of aluminum dross which contains more than 30 percent by weight of aluminum oxide;
 b. 5 to 20 percent by weight of cement;
 c. 2 to 10 percent by weight of a calcium compound selected from the group consisting of calcium carbonate, calcium hydroxide and mixtures thereof;
 d. 1 to 15 percent by weight of a chloride compound selected from the group consisting of magnesium chloride, sodium chloride and mixtures thereof; and
 e. from about 1 to about 7 percent by weight of water.

4. The composition of claim 3 wherein said cement is selected from the group consisting of Portland cement, alumina cement, iron cement, slag cement and mixtures thereof.

* * * * *